United States Patent
Premartin et al.

(10) Patent No.: US 8,011,543 B2
(45) Date of Patent: Sep. 6, 2011

(54) LOAD CARRIER MOUNTED AT THE REAR OF A MOTOR VEHICLE

(75) Inventors: Arnaud Premartin, Montrouge (FR); Patrick Saillard, Paris (FR); Olivier Veuillot, Boissy St Leger (FR)

(73) Assignee: Renault S.A.S., Boulogne Billancourt (FR)

( * ) Notice: Subject to any disclaimer, the term of this patent is extended or adjusted under 35 U.S.C. 154(b) by 1055 days.

(21) Appl. No.: 10/591,497

(22) PCT Filed: Mar. 1, 2005

(86) PCT No.: PCT/FR2005/050133
§ 371 (c)(1),
(2), (4) Date: Aug. 16, 2007

(87) PCT Pub. No.: WO2005/591497
PCT Pub. Date: Sep. 15, 2005

(65) Prior Publication Data
US 2008/0042419 A1    Feb. 21, 2008

(30) Foreign Application Priority Data
Mar. 2, 2004 (FR) .................................. 04 50411

(51) Int. Cl.
*B60R 9/06* (2006.01)
*F16B 21/06* (2006.01)

(52) U.S. Cl. ........ 224/511; 224/512; 224/519; 224/521; 280/769; 403/325; 403/326

(58) Field of Classification Search ................. 224/511, 224/518, 519, 521, 512; 280/762, 769; 403/325, 403/326
See application file for complete search history.

(56) References Cited

U.S. PATENT DOCUMENTS

| 1,955,969 | A | * | 4/1934 | Marzolf | 403/325 |
| 2,545,813 | A | * | 3/1951 | Jackson | 403/325 |
| 3,169,782 | A | * | 2/1965 | Columbus | 280/482 |

(Continued)

FOREIGN PATENT DOCUMENTS

DE    203 04 098    6/2003

(Continued)

*Primary Examiner* — Gary Elkins
(74) *Attorney, Agent, or Firm* — Oblon, Spivak, McClelland, Maier & Neustadt, L.L.P.

(57) ABSTRACT

A load carrier including a fixing system on a rear part of a vehicle including: a longitudinal arm with one end to interact with a sleeve joined to a structural element of the vehicle; a lever with one end mounted to rotate relative to the arm about a transversal pin supported by the end of the arm; a device placed between the lever and the arm and exerting a force in a direction; and a lock for the fixing system. The lock includes a handle having a gripping part and a cam part mounted to rotate relative to the lever about a transversal pin supported by the free end of the lever between: (1) an unlocked state in which movement of the handle about the pin is free between a position in which it abuts against the free end of the lever and a position in which a point of a leading surface of the cam is in contact with the arm; and (2) a locking state in which movement of the handle about the pin and interaction of the handle with the arm causes the lever to rotate about the pin in a clockwise direction until reaching a locked end position of the lever at which the lever is stressed and joined to the sleeve.

12 Claims, 3 Drawing Sheets

U.S. PATENT DOCUMENTS

| | | | |
|---|---|---|---|
| 3,941,492 A | | 3/1976 | Meinunger |
| 4,422,794 A | | 12/1983 | Deken |
| 4,880,084 A | | 11/1989 | Tanaka et al. |
| 4,971,474 A | | 11/1990 | Sprague |
| 5,244,133 A | * | 9/1993 | Abbott et al. .................. 224/521 |
| 5,327,928 A | * | 7/1994 | Thomason ............... 137/246.22 |
| 5,460,304 A | | 10/1995 | Porter et al. |
| 5,685,686 A | * | 11/1997 | Burns ........................... 224/519 |
| 5,690,260 A | * | 11/1997 | Aikins et al. .................. 224/521 |
| 5,692,855 A | * | 12/1997 | Burton .......................... 403/325 |
| 5,738,261 A | | 4/1998 | Dula |
| 6,334,561 B1 | * | 1/2002 | Cole .............................. 224/521 |
| 6,561,724 B1 | * | 5/2003 | Carletti ......................... 403/326 |
| 7,293,934 B1 | * | 11/2007 | Huang .......................... 403/325 |

FOREIGN PATENT DOCUMENTS

| | | |
|---|---|---|
| DE | 102005033082 B3 * | 2/2006 |
| FR | 2 823 161 | 10/2002 |
| FR | 2823161 A1 * | 10/2002 |
| WO | WO 03/039912 A1 | 5/2003 |

* cited by examiner

LOAD CARRIER MOUNTED AT THE REAR OF A MOTOR VEHICLE

BACKGROUND

The invention concerns a load carrier intended for fitting to the rear of a motor vehicle.

More specifically, the invention concerns a load carrier equipped with a system of fixing to a rear part of a vehicle comprising the following or equivalent means:
- a longitudinal arm, one end of which is capable of co-operating with a sleeve solidly connected to an element of the structure of the vehicle,
- a lever, one end of which is mounted such that it can rotate, with respect to the arm, on a transverse pin carried by the end of the arm,
- a return means incorporated between the lever and the arm, exerting a force directed from the arm to the lever,
- a means of locking the fixing system.

It is increasingly commonplace to equip the rear of motor vehicles with load carriers such as bicycle carriers. However, these bicycle carriers must have a fixing system which is both easy and quick to use. The fixing system must also be safe and must not create a risk of accidental or intentional separation of the bicycle carrier.

From publication no. WO-A-03039912, we know a bicycle carrier, which has a fixing system comprising two longitudinal arms, the end of each of these arms being suitable for insertion into a sleeve carried by an element of the structure of the vehicle. One end of a lever is mounted such that it rotates on a pin carried by the end of the arm. The lever also comprises a groove intended for co-operation with a finger incorporated in the sleeve. A return means is incorporated between the arm and the free end of the lever. The fixing system also comprises a locking screw, intended for co-operation with a hole contrived in the lever, and a thread contrived in the arm, each found on either side of the return means.

Thus, when a user inserts the arm into the sleeve, the lever rotates downwards on the pin and is stressed until the finger penetrates automatically the groove and remains in place under the effect of the return means. The locking screw enables the lever to be kept in tension to prevent the fixing system from separating accidentally.

However, this fixing system has a disadvantage: the locking system, which requires a certain tightening force, is not easy to use. For example, people with only little strength in their hands or else users wearing gloves in cold weather, for example, will not succeed in tightening sufficiently the locking means which, with vibration, is then at risk of loosening completely. The load carrier, whose fixing is unlocked, can then separate from the vehicle and cause a danger.

BRIEF SUMMARY

To overcome these disadvantages, the subject of the invention is a load carrier with a safe and easily usable fixing system.

The subject of the invention is also a load carrier, which can be used on different vehicles.

The subject of the invention is moreover a load carrier, the risks of theft of which are limited.

To this effect, the invention proposes a load carrier of the aforementioned type, characterized in that the locking means is a handle having a gripping part and a part forming a cam mounted such that, with respect to the lever, it can rotate on a transverse pin carried by the free end of the lever, between:
- an unlocked state, in which the movement of the handle around the pin is free between a position in which it abuts against the free end of the lever and a position in which a so-called "leading" point of the surface of the cam is in contact with the arm, and
- a locked state, in which the movement of the handle around the pin and the co-operation of the handle with the arm cause the lever to rotate on the pin in a clockwise direction as far as a locked end position of the lever, in which the lever, under stress, is solidly connected to the sleeve.

According to other characteristics of the invention:
- a groove contrived in the surface of the cam is guided along the arm,
- the groove and the arm are of complementary shape,
- the leading point is the point of the surface of the cam furthest away from the pin,
- the distance between the pin and the point of the cam is greater than a distance corresponding to the distance between the pin and the arm, when the lever is in a locked end position,
- when locking the handle, the distance between the pin and the arm increases after the point has been passed,
- the pin of the handle is mounted in translation within a slot contrived in the sides of the lever such that the distance between the pin and the pin can be made to vary,
- means of locking the pin inside the slot are provided,
- a lock is provided to solidly connect the handle to the free end of the lever extending beneath the gripping part,
- a ratchet means is provided to solidly connect the handle to the free end of the lever extending beneath the gripping part.

BRIEF DESCRIPTION OF THE DRAWINGS

Other characteristics and advantages of the invention will appear on reading the description of examples of construction of a load carrier according to the invention in reference to the appended drawings, in which.

DETAILED DESCRIPTION

In the following description, we will take, without limitation, a longitudinal, vertical and transverse direction as shown by the trihedron L,V,T of FIG. 1. We will also take, as convention, the rear-to-front direction as being from left to right in FIGS. 2 to 5.

Identical or analog elements are designated by the same reference numbers.

The load carrier is generally symmetrical about a median longitudinal plane.

Figure 1:
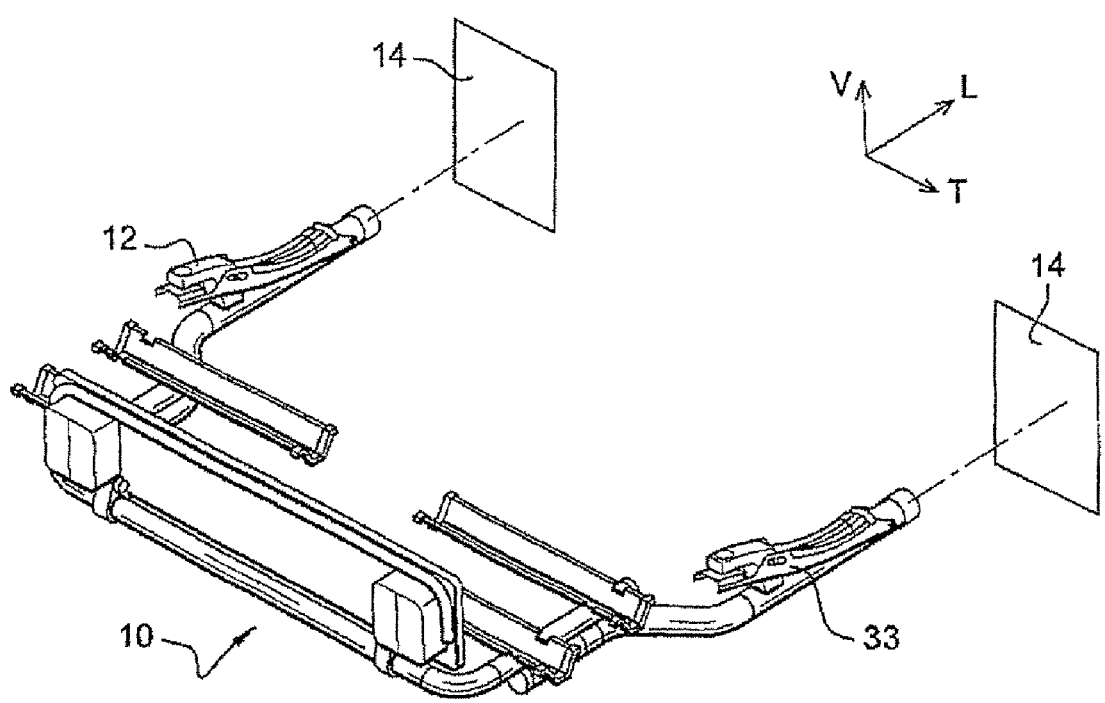
FIG. 1 is a perspective view of a load carrier according to the invention fitted to the rear of a vehicle.

As shown in FIG. 1, a load carrier 10 comprising two longitudinal arms 12 is fitted to the rear of a vehicle 14 represented diagrammatically. The two arms 12, for example of tubular form, are symmetrical about the median longitudinal plane.

Figure 2:
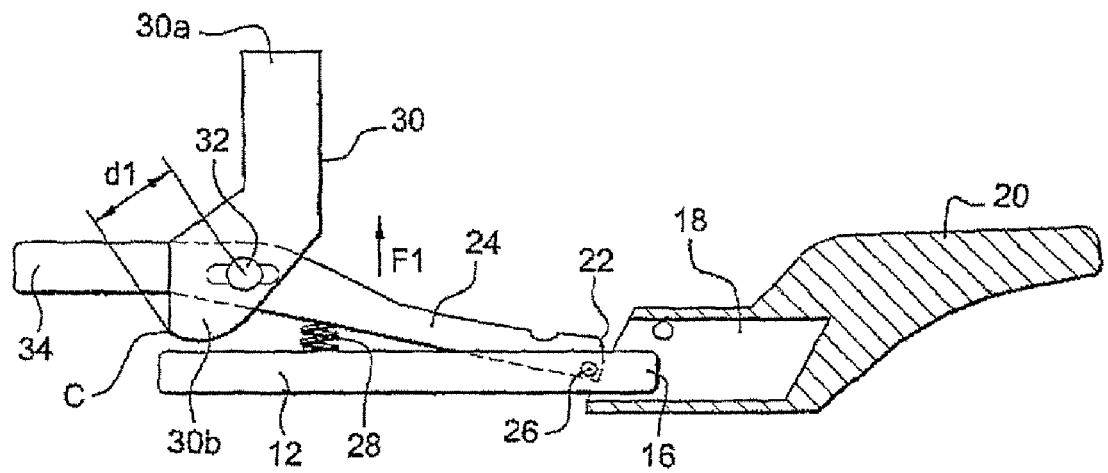
FIG. 2 is a diagrammatic side elevation of a system of fixing the load carrier according to the invention in an initial insertion position.

As shown in FIG. 2, an end 16 of the arm 12 co-operates with a sleeve 18, generally directed longitudinally, solidly connected to an element of the vehicle structure 20.

An end 22 of a lever 24 is mounted such that it rotates about the arm 12 on a transverse pin 26 carried by the said arm 12.

A return means 28, such as a helical spring for example, is incorporated between an essentially central part of the lever 24 and the arm 12. The return means 28 exerts a force, whose direction is shown by the arrow F1, tending to move the lever 24 away from the arm 12.

A handle 30 is mounted such that it rotates with respect to the lever 24 about a transverse pin 32 carried by one end 34 of the lever 24. The handle 30 has a gripping part 30a and a part forming a cam 30b.

One free end 34 of the lever 24 extends beneath the gripping part 30a of the handle 30.

Prior to longitudinal insertion of the arm into the sleeve 18, the handle 30 is in an unlocked state, in which its movement is free between a position in which the gripping part 30a abuts against the end 34 of the lever 24 and a position in which a point C of the cam 30b abuts against the arm 12.

The point C is the so-called "leading" point of the cam 30b. It is in fact the first point of the cam 30b to enter into contact with the arm 12 during rotation of the handle 30 on the pin 32 in an anticlockwise direction.

The point C is the point of the cam 30b which is the furthest away from the pin 32 and the distance between the pin 32 and the point C is shown as d1.

Figure 3:
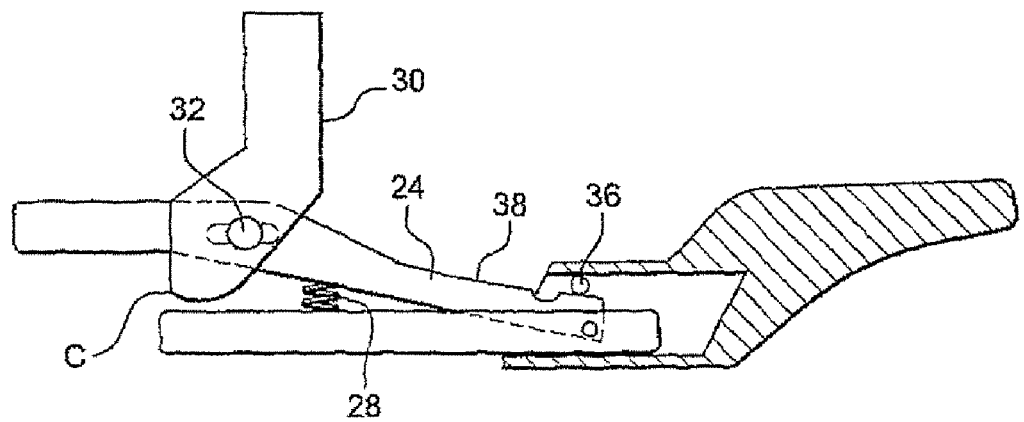
FIG. 3 is a diagrammatic side elevation of the fixing system of FIG. 2 in an intermediate insertion position.

As shown in FIG. 3, the fixing system is in an intermediate insertion position, in which it is displaced towards the front of the vehicle.

A transverse finger 36 incorporated in the sleeve 18 exerts a force on a top surface 38 of the lever 24 against the return means 28. The lever 24 is then in tension and the spring 28 is compressed.

Figure 4:
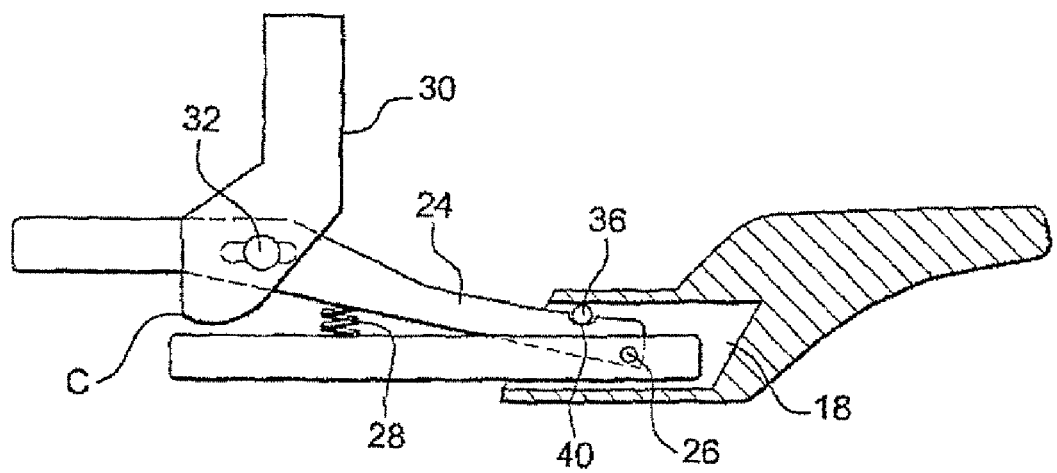
FIG. 4 is a diagrammatic side elevation of the fixing system of FIG. 2 in an unlocked fixed position.

As shown in FIG. 4, the fixing system is in a so-called fixed position, in which the arm has again moved forwards until the finger 36 penetrates automatically into a slot 40 contrived in the surface 38 of the lever 24 under the effect of the return means 28.

The handle 30 is still in an unlocked state in this position.

Figure 5:
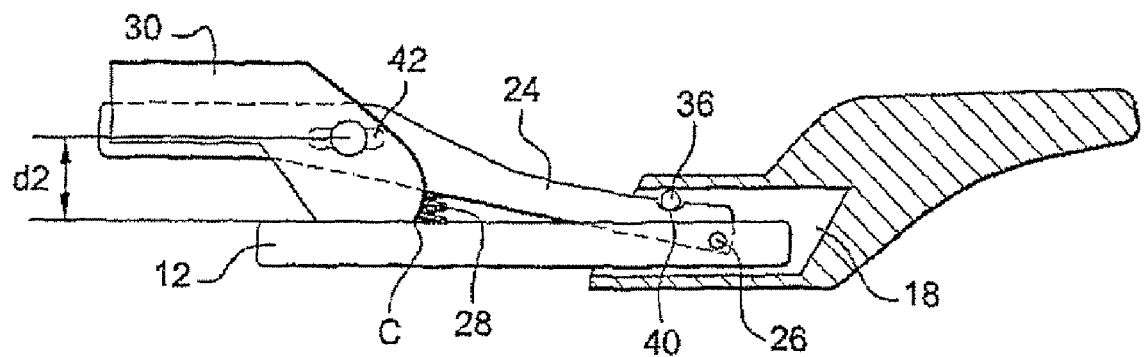
FIG. 5 is a diagrammatic view of the fixing system of FIG. 2 in a locked fixed position.

As shown in FIG. 5, the fixing system is switched to a so-called locked fixed position.

By lowering the gripping part 30a, the handle 30 is switched from its unlocked state to a locked state, by rotation in an anticlockwise direction on the pin 32, such that, during the locking operation, the distance between the pin 32 and the arm 12 increases until it is equal to a distance d2.

Thus, when the handle 30 rotates on the pin 32 in an anticlockwise direction, the lever 24 rotates in a clockwise direction on the pin 26 and is tensioned in a locked final position, in which the finger 36 cannot disengage from the slot 40.

Advantageously, during rotation of the cam 30b on the pin 32, passing of the point C forms a point of resistance enabling the risks of accidental unlocking to be limited. The distance d1 being greater than the distance d2, the stress applied to the lever 24 on passing the point C is then effectively greater that that applied, when the lever 24 is locked. The point of resistance in fact corresponds to the moment at which the distance between the pin 32 and the arm 12 is equal to d1.

The surface of the cam 30b is complementary with that of the arm 12 and has a groove, which is not represented, in the shape of a sector of a circle for example, such that the handle 30 can be guided on the arm 12 during rotation. This conformation of the cam 30b also allows the handle 30 to be laterally maintained on the arm 12, thereby limiting the risk of dislocation of the fixing system in the event of a lateral impact, for example.

Advantageously, the pin 32 is mounted in translation within a slot 42 contrived in the sides 33 of the lever 24. The pin 32 comprises a part capable of co-operating with means of indexing the position of the pin 32, which are not detailed because known in themselves. The slot 42 can, for example, comprise notches. The pin 32 can then occupy a state of locking in one position and a state of unlocking allowing passage from one position to another.

In this way, the position of the pin 32, in other words its distance with respect to the pin 26, can be made to vary. The sleeve 18 can in fact have a different configuration depending on the vehicle. It can, for example, be longer or else the finger 36 can be more or less high. These parameters therefore cause the degree of rotation of the lever 24 to vary according to the type of vehicle used. For example, if the degree of rotation of the lever 24 is greater, the handle 30 may swivel idly and not be able to co-operate with the arm 12. Conversely, if the degree of opening of the lever is smaller, it may be impossible, because of the arm 12, to make the handle rotate on the pin 32. But, it is awkward to have to change the bicycle carrier according to the vehicle being used. The slot 42 therefore allows the position of the pin 32 to be varied without altering the way the cam 30b interacts with the arm 12, according to the vehicle being used. This therefore offers the advantage of being able to always use the same bicycle carrier irrespective of the vehicle on which it is mounted.

Advantageously, ratchet means, which are not represented, allow the gripping part 30a to be solidly connected to the end 34 of the lever 24.

Advantageously, a conventional lock, which will not be described here because it is known in itself, allows the handle 30 to be solidly connected to the end 34 of the lever 24 extending beneath the gripping part 30b. It may be foreseen that the key enabling the lock to be locked is the same as that of the vehicle. This offers the advantage of improving the locking of and preventing the theft of the load carrier, when it is fixed to the vehicle.

To unlock the fixing system, the gripping part 30b is simply pulled such that the handle 30 rotates in a clockwise direction on the pin 32. Thus, during rotation of the handle 30, the distance between the pin 32 and the arm 12 decreases, which causes the lever 24 to rotate in an anti-clockwise direction on the pin 26 and against the return means 28. In this way, after passing the point of resistance, the finger 36 is no longer locked in the slot 40, which allows the arm 12 to be pulled longitudinally rearwards. Once the arm 12 has cleared the sleeve 18, the lever 24 returns to a position away from the arm 12 under the action of the return means 28.

The invention claimed is:

1. A load carrier equipped with a system of fixing to a rear part of a vehicle, comprising:
    a longitudinal arm, one end of which is configured to co-operate with a sleeve solidly connected to an element of a structure of the vehicle;
    a lever, one end of which is mounted to rotate, with respect to the arm, on a transverse pin carried by the end of the arm and passing through the lever;
    return means incorporated between the lever and the arm, exerting a force to move the lever away from the arm and into an engagement position with the sleeve;
    means for locking the fixing system;
    wherein the locking means includes a handle with a gripping part and a part forming a cam configured to abut against the arm and mounted such that, with respect to the lever, the locking means can rotate on a transverse pin carried by a free end of the lever, between an unlocked state and a locked state of the lever with sleeve.

2. The load carrier as claimed in claim 1, wherein a groove on the surface of the cam is guided along the arm.

3. The load carrier as claimed in claim 2, wherein the groove and the arm are of complementary shape.

4. The load carrier as claimed in claim 1, wherein the cam includes a leading point that is a point of the surface of the cam furthest away from the pin carried by the free end of the lever.

5. The load carrier as claimed in claim 4, wherein a distance between the pin carried by the free end of the lever and the leading point of the cam is greater than a distance between the pin carried by the free end of the lever and the arm, when the lever is in a locked end position.

6. The load carrier as claimed in claim 1, wherein, when locking the handle, a distance between the pin carried by the free end of the lever and the arm increases after a leading point of the surface of the cam has been passed.

7. The load carrier as claimed in claim 1, wherein the pin carried by the free end of the lever is mounted in translation within a slot located in sides of the lever such that a distance between the pin carried by the free end of the lever and the pin carried by the end of the arm can be made to vary.

8. The load carrier as claimed in claim 7, further comprising means for locking the pin carried by the free end of the lever inside the slot.

9. The load carrier as claimed in claim 1, further comprising a lock to solidly connect the handle to the free end of the lever extending beneath the gripping part.

10. The load carrier as claimed in claim 1, further comprising ratchet means for solidly connecting the handle to the free end of the lever extending beneath the gripping part.

11. The load carrier as claimed in claim 1, wherein the return means is a spring.

12. The load carrier as claimed in claim 1, wherein a top surface of the lever includes a slot that is configured to receive a finger located in the sleeve to engage the load carrier with the sleeve.

* * * * *

UNITED STATES PATENT AND TRADEMARK OFFICE
CERTIFICATE OF CORRECTION

| | | |
|---|---|---|
| PATENT NO. | : 8,011,543 B2 | Page 1 of 1 |
| APPLICATION NO. | : 10/591497 | |
| DATED | : September 6, 2011 | |
| INVENTOR(S) | : Arnaud Premartin et al. | |

It is certified that error appears in the above-identified patent and that said Letters Patent is hereby corrected as shown below:

On the title page, Item (87), the PCT Pub. No. is incorrect. Item (87) should read:

-- (87)  PCT Pub. No.:  WO2005/085006
PCT Pub. Date: Sep. 15, 2005 --

Signed and Sealed this
Twenty-second Day of November, 2011

David J. Kappos
*Director of the United States Patent and Trademark Office*